Feb. 5, 1963    R. H. KRESS    3,076,680
TRAILER DUMPING VEHICLE
Filed March 31, 1959    6 Sheets-Sheet 4

INVENTOR:
RALPH H. KRESS
BY John F. Schmidt

Feb. 5, 1963   R. H. KRESS   3,076,680
TRAILER DUMPING VEHICLE

Filed March 31, 1959   6 Sheets-Sheet 5

INVENTOR:
RALPH H. KRESS
BY John F. Schmidt

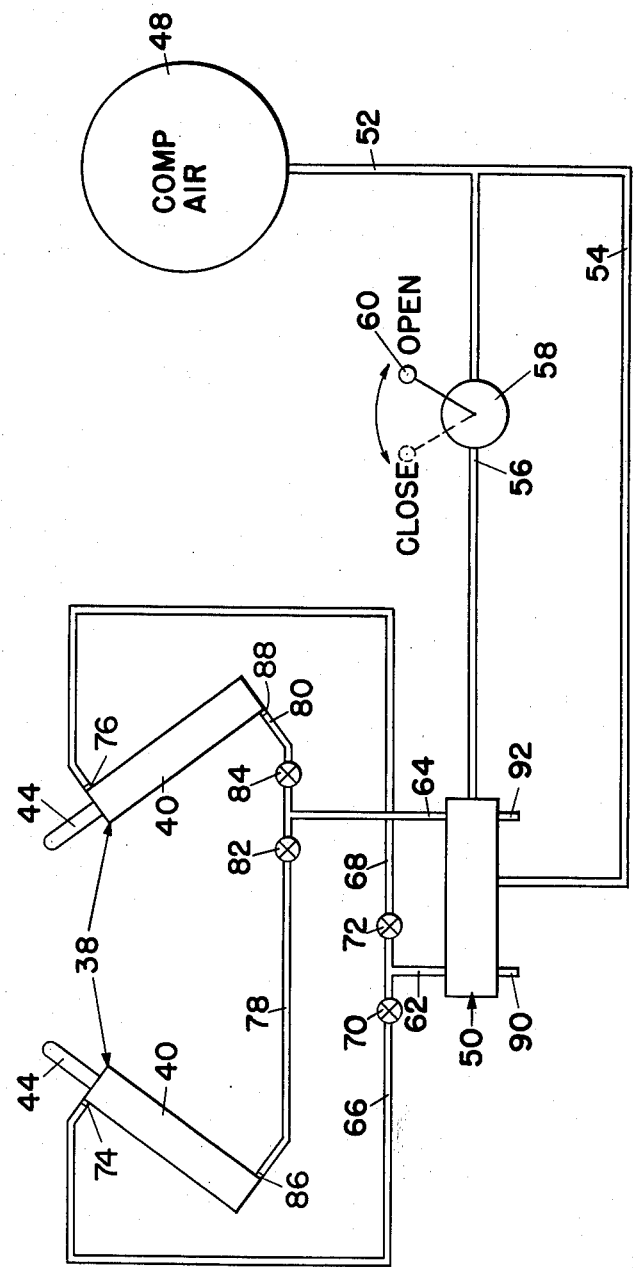

United States Patent Office 3,076,680
Patented Feb. 5, 1963

3,076,680
TRAILER DUMPING VEHICLE
Ralph H. Kress, Peoria, Ill., assignor to LeTourneau-Westinghouse Company, Peoria, Ill., a corporation of Illinois
Filed Mar. 31, 1959, Ser. No. 803,291
6 Claims. (Cl. 298—35)

This invention relates to vehicles, and more particularly to a bottom dump type vehicle which is adapted to discharge into an opening at ground level.

With the development of huge earth moving machines, the strip mining of coal has become an increasingly important industry over the last few years. Large machines make the stripping of overburden comparatively inexpensive and it becomes economically feasible to mine more and more coal seams by surface mining methods.

The coal which is thus mined must of course be transported from the vein to places where it can be processed for consumption. The transporters used for the purpose can be and sometimes are railway type track mounted vehicles but it is more convenient for many operations to use rubber-tired equipment. For more efficient operation of such installations, hauling vehicles of this type are very large in order to carry as large a load as possible. Vehicles of this type have therefore a tendency to become extremely large, cumbersome, and unwieldy. Because movement at high speeds reduces the cycles time and increases the availability of equipment, it is desirable to build haulers which are capable of traveling at high speeds. However, in order to maintain a high degree of maneuverability of such haulers, it is desirable to avoid building these haulers too high, because a high center of gravity requires lower operational speeds to avoid upsetting or overturning the equipment on winding haul roads. It is therefore desirable to keep the center of gravity of such equipment low in order to permit high hauling speeds.

It is accordingly an object of this invention to provide a transporter for minerals such as coal and the like which is capable of carrying a large quantity of mineral at a low center of gravity and at high speeds, and which can rapidly and efficiently discharge the mineral into an opening at ground level. This and other objectives are accomplished in a unique design of a bottom dump vehicle body of which the details are set forth below and in accompanying drawings.

In the drawings:

FIG. 7 is a diagram of the fluid pressure circuit for operating the doors of the bottom dump vehicle.

Figure 1:
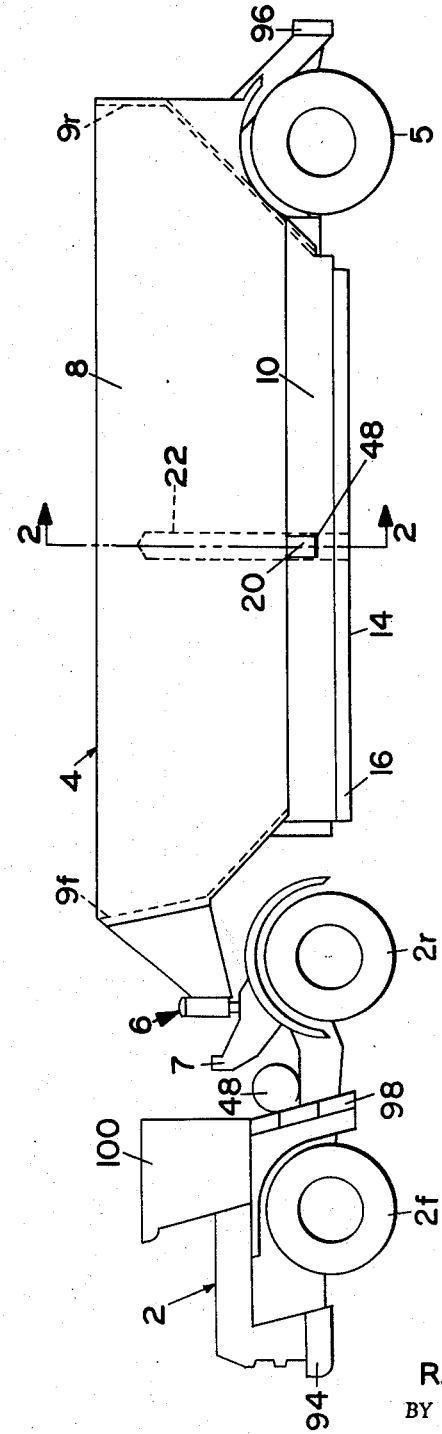
FIG. 1 is a side elevation view of a hauling vehicle or transporter made according to this invention.

Referring now to the drawings in detail, FIG. 1 shows a mineral transporter made according to this invention comprising a tractor indicated generally at 2 having front and rear wheels 2f and 2r respectively and a trailing dumping vehicle indicated generally at 4, the vehicle 4 being here shown as a semitrailer type having wheels 5 and coupled to the tractor by any suitable coupling 6. Coupling 6, pivot stop 7, and other details of the vehicle are disclosed in this same inventor's Patent 3,014,739, issued December 26, 1961.

The vehicle 4 includes a body having vertical side walls 8 which run parallel to the direction of straight-ahead movement of the vehicle and end walls 9f and 9r at the forward and rear ends, respectively. Bottom panels 10 are secured to the lower edges of the side walls 8. Panels 10 slope inward and downward and their inner edges 12 leave an elongated opening which can be closed by doors 14.

The bottom panels 10 are made to slope as indicated in order to permit ready discharge of the load of mineral. A minimum slope is desired for maximum loading, but the slope should be enough to permit quick and clean dumping. A slope of 45° has been found to provide optimum all-around characteristics.

Doors 14 are provided with outer edges 16 and inner edges 18. In the door-closed position, the outer edges 16 of the doors are located adjacent to the inner edges 12 of the bottom panels, and the inner edges 18 of the doors come together in order to complete the closure of the elongated opening between the edges 12. Stops 20 are placed at suitably located intervals on the under side of bottom panels 10 and are adapted to engage the edges 16 of doors 14 to locate the doors in their door-open position. In the preferred embodiment shown, the inner surface of each door 14 forms a substantially plane surface. Hinge means for each door are provided, the hinge means being pivotable about an axis spaced from the plane of the door, or from a plane passing through the edges of the door, if the upper surface of the door should be curved instead of plane.

Figure 5:
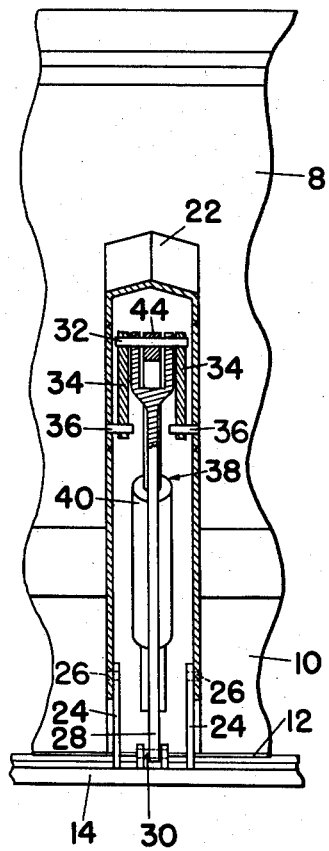
FIG. 5 is a view in section substantially on line 5—5 of FIG. 2.
Figure 6:
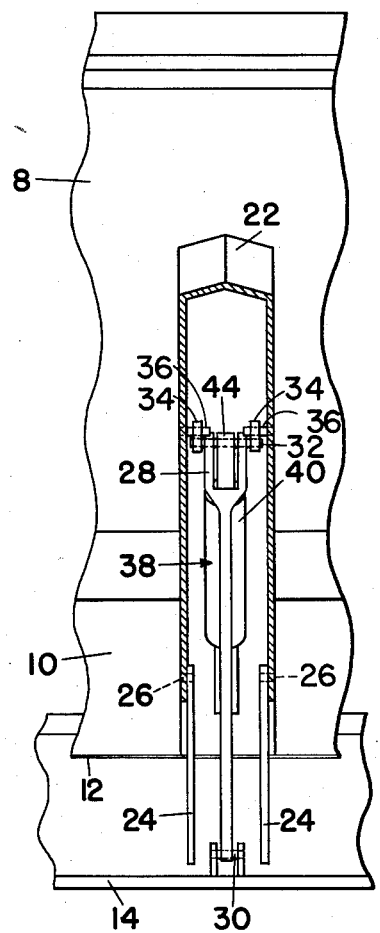
FIG. 6 is a view in section substantially on line 6—6 of FIG. 3.

Between the ends of the body of trailing unit 4, there is disposed a double walled partition 22 which houses the door operating mechanism. The door hinges referred to above may be three in number for each door as in the embodiment here illustrated, the closely adjacent leaves 24 shown in FIGS. 5 and 6 being so close together as to act as one hinge. The hinges 24 are pivotally secured as shown at 26. As can be seen by reference to FIG. 2, hinge pivot 26 is spaced above the plane of door 14 in order to move the door sidewise as well as downward during the opening operation. This produces a quicker opening of the door for a given amount of movement of the operating linkage.

Reference will now be had to FIGS. 2, 3, 5 and 6 for a detailed discussion of the door operating mechanism. As there shown, an elongated member 28 is provided with a pivotal connection 30 with its associated door. There is a second pivotal connection 32 for the other end of the elongated member 28, connection 32 serving to connect elongated member 28 with one end of a link 34. A third pivotal connection 36 is provided for the remaining end of link 34. Means are provided to mount the third pivotal connection 36 in any suitable conventional manner in the walls of the double-walled partition 22.

Motor means are disposed in the double-walled partition to operate the above-described linkage between the door-closed position and the door-open position. In the illustrated embodiment, fluid operated jacks 38 are shown. The cylinder 40 of each jack is pivotally mounted on a bracket 42 on the associated bottom panel 10; piston rod 44 is pivotally connected with the second pivotal connection 32.

Figure 3:
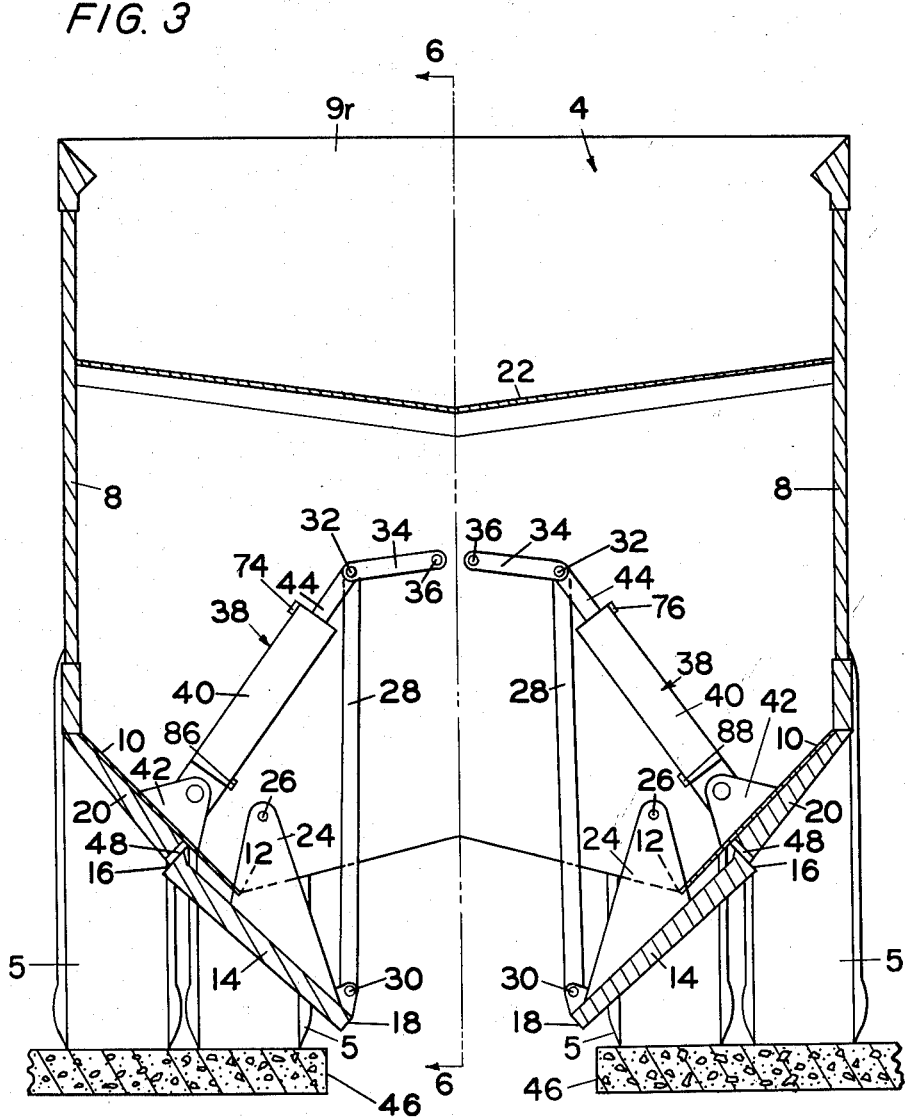
FIG. 3 is a view similar to FIG. 2 but showing the bottom dump doors open in the position to discharge mineral from the transporter.

It can be seen by referring to FIG. 3 that a vehicle body made according to this invention is adapted to discharge into an elongated opening 46 at ground level. More particularly, a vehicle such as the one disclosed here is adapted to be pulled between guides (not shown) so as to locate the vehicle substantially centrally over the elongated opening 46. The opening 46 is of course over a hopper of some sort which is designed to receive the mineral or other payload discharged from the vehicle through the opening 46. The hopper can then in its turn load the mineral into railroad cars for further processing. Alternatively, the hopper could discharge on to a conveyor belt, or in some cases, the vehicle could discharge directly on to a conveyor belt located beneath the opening 46.

As can be seen in FIG. 3, the inner edges 18 of the doors, in their wide open position, closely approach the ground level and are spaced apart by an amount less than the width of the elongated opening 46. This gives the operator of the vehicle a little leeway to the right or left so that the vehicle need not be centered exactly over the opening 46. It further assures against spillage of any appreciable amount of mineral along the upper edges of the opening 46.

Motor means were referred to above to operate the door linkage. The fluid operated jacks 38 are shown in a circuit diagram in FIG. 7, wherein a source of compressed air 48 is connected with a valve 50 by means of conduits 52 and 54. Valve 50 may be any one of a number of suitable commercially available valves having an internal movable element biased into one operating position by a spring and movable into another operating position by air pressure. A branch conduit 56 connects conduit 52 with one end of valve 50. A simple "On-and-Off" type of control valve 58 in conduit 56 is provided with an operating handle 60. In the application of valve 58 here shown, the "On" position of handle 60 is the "Doors Open" position; the "Off" position is the "Doors Closed" position.

Figure 2:
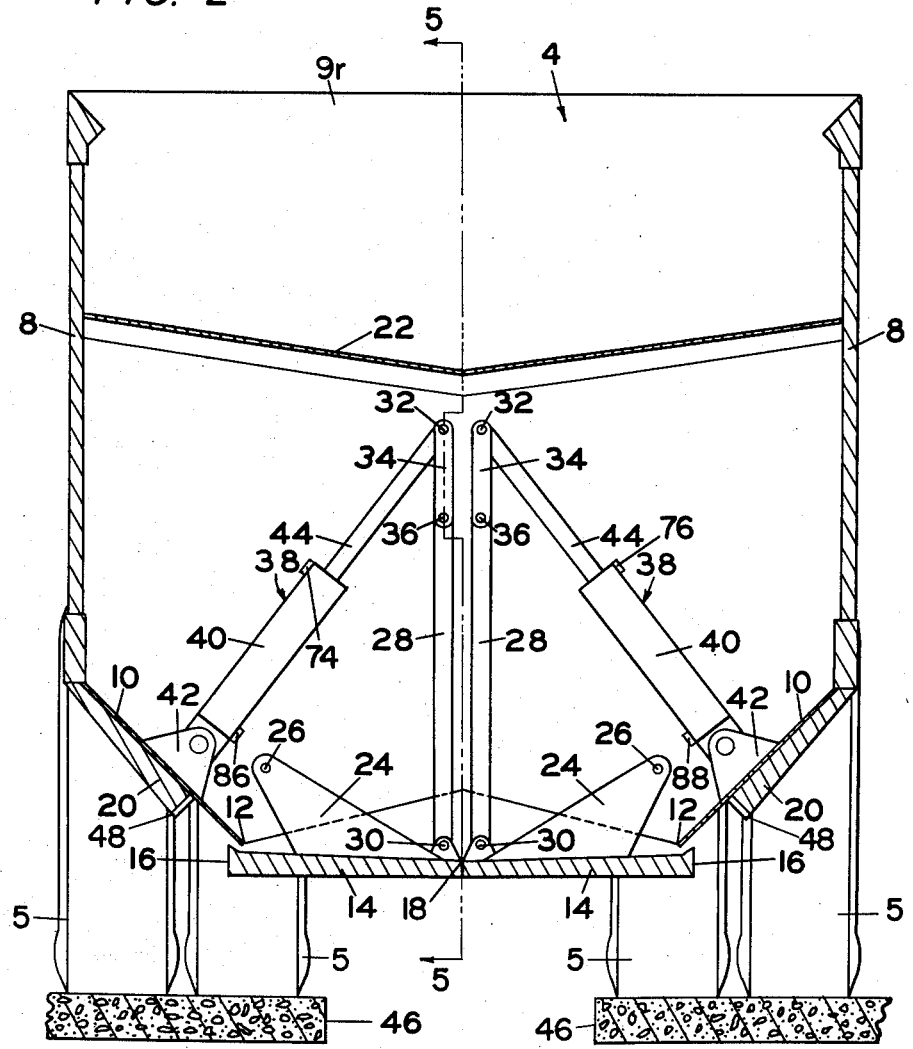
FIG. 2 is a view in section substantially on line 2—2 of FIG. 1.

Valve 50 has two supply ports with which conduits 62 and 64 connect. Conduit 62 connects with branch conduits 66 and 68 in which there may be provided throttle valves 70 and 72 respectively. Conduits 66 and 68 connect with suitable ports 74 and 76 respectively (FIGS. 2 and 3) in the upper ends of jacks 38. Conduit 64 connects with branch conduits 78 and 80 in which there are preferably provided throttle valves 82 and 84 respectively. Branch conduits 78 and 80 connect respectively with suitable ports 86 and 88 in the lower ends of jacks 38 (FIGS. 2 and 3).

Throttle valves 70, 72, 82 and 84 are preferably provided so that fluid pressure in the several conduits may be adjusted for simultaneous operation of the doors 14. Upon shifting of the movable element of valve 50 from one operating position to the other, that one of conduits 62 and 64 which was under pressure is vented to atmosphere. Vents 90 and 92 connect respectively the conduits 62 and 64 to that end.

Numerous incidental features, while having no direct bearing on the invention, may nevertheless be pointed out by way of completing the disclosure. Thus the tractor has a front bumper 94, and the trailer a rear bumper 96 which may serve as a push-plate if necessary. A ladder 98 is provided to give the operator ready means of access to the cab 100.

Figure 4:
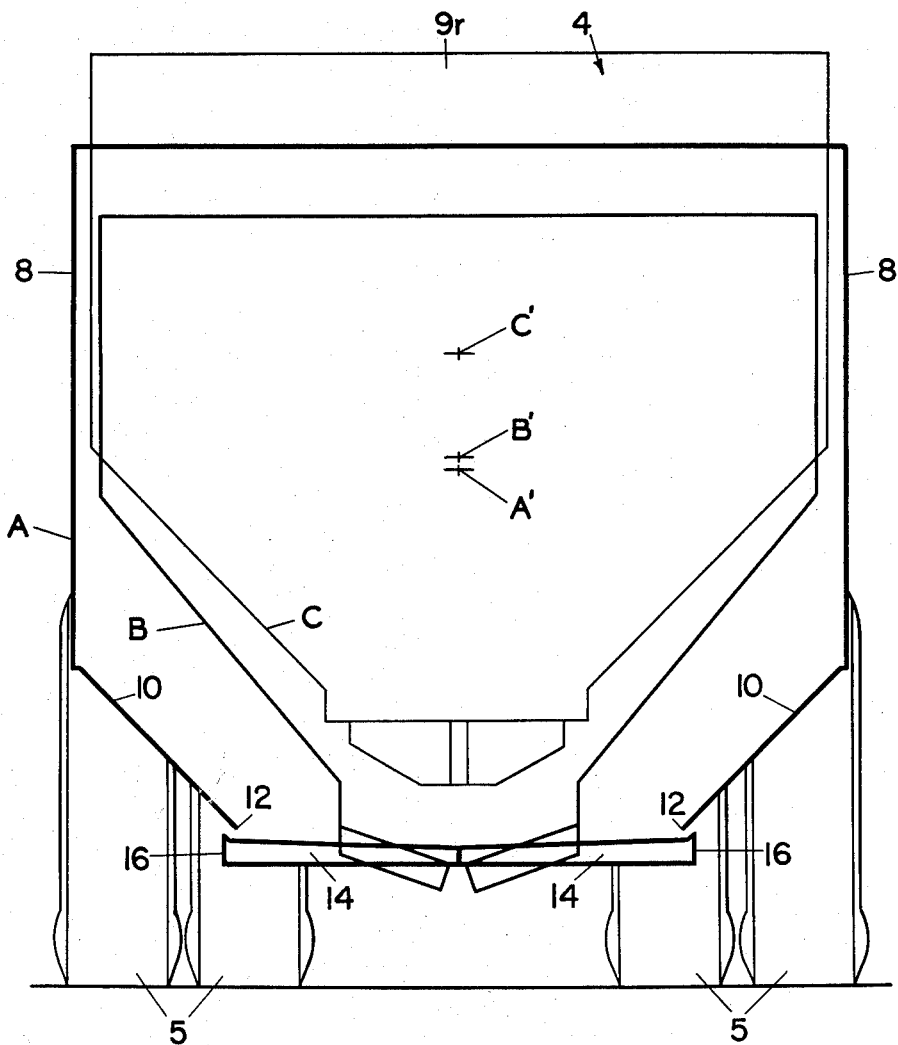
FIG. 4 is a schematic view similar to that of FIG. 2 but showing a transporter made according to this invention schematically and illustrating conventional types of transporters for purposes of comparison.

Reference will now be had to FIG. 4 for a comparison of a vehicle made according to this invention with two more conventional types. The vehicle of this invention is indicated by the outline A, and vehicles according to two conventional designs are shown by outlines B and C. FIG. 3 shows how the doors of vehicle A co-operate with the bottom panels 10 to form a chute for the discharge of mineral into the elongated opening 46. Vehicles B and C do not utilize this principle; instead vehicle C permits the doors to drop straight down into substantially vertical planes, while the doors of vehicle B move sidewise and up; both rely on the opening between the sloping panels to form the necessary chute to discharge the material into the elongated opening at ground level. Consequently, the vehicles B and C have a smaller cross section and thus a smaller volume, while at the same time they have much higher centers of gravity. The center of gravity of vehicle A is shown at A', the center of gravity of vehicle B is shown at B', and the center of gravity of vehicle C is shown at C'.

*Operation*

By referring to FIG. 2, it can be seen that each motor 38 holds its associated door closed by holding the pivotal connections 30, 32, and 36 substantially in a straight line. In the embodiment shown this straight line is substantially vertical. By "substantially" is meant merely that a high degree of precision is not required. As will be understood by those skilled in the art, a small amount of misalignment of the three pivotal connections can be tolerated. The important point is to maintain sufficient alignment to assure that the weight of mineral or other payload on the doors 14 is carried by the pivots 36 rather than by the motors 38.

Motors 38 are double acting jacks. With the vehicle body shown in FIG. 2 filled with mineral and disposed over the elongated opening 46, the operator moves handle 60 (FIG. 7) to the "Open" position, connecting the compressed air source 48, conduits 52 and 54, valve 50, conduits 62, 66 and 68 and thus admitting fluid under pressure into the upper ends of cylinders 40, collapsing the jacks 38 and pulling the pivotal connections 32 out of alignment with their associated pivotal connections 36 and 30.

As the misalignment increases, the load on the doors 14 increasingly acts to force the doors downward and outward about their hinge pivots 26. As soon as the load on the doors begins to be effective to force the doors open, the jacks 38 begin to exercise a retarding effect because of the need for forcing fluid out of the lower ends of cylinders 40. This has a cushioning effect on the door opening operation and serves to prevent hammering of the inner edges 16 of the doors against the stops 20. If desired, a resilient cushion or bumper pad 48 of rather firm rubber may be provided at the lower end of each stop 20 in order still further to cushion the stopping of doors 14 at the limits of their wide-open position. With the doors 14 wide open as shown in FIG. 3, the doors form continuations of their associated bottom panels 10 to form a chute by which the mineral or other payload in the vehicle is directed through the elongated opening 46 into the hopper below. The closeness of the inner edges 18 to the ground level (approximately 4 inches in the embodiment presently in production) gives a very clean dumping action and results in vertually no spillage along the top edges of the discharge floor in which the elongated opening 46 is provided.

After the load is dumped, fluid under pressure is admitted to the lower ends of cylinders 40 and the doors are returned to the closed position shown in FIG. 2.

It will be apparent from the foregoing that this invention provides a new bottom dumping vehicle having a greater carrying capacity than conventional vehicles but at the same time having a lower center of gravity which makes possible more rapid movement of the vehicle in use without risking overturn on the winding haul roads which are so often encountered by vehicles of this type. Other advantages will be apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What is claimed is:

1. An elongated bottom dump vehicle body having vertical side walls parallel to the direction of straight-ahead movement, bottom panels secured to the lower edges of the side walls and sloping inward and downward and leaving an elongated opening between the inner edges of the panels, a pair of doors having their outer edges adjacent the inner edges of the panels when the doors are in the closed position and with their inner edges coming together, hinge means for each door mounting the doors for movement outward and downward from the door-closed position to the door-open position, a double walled partition between the ends of the body and above the doors, an elongated member for each door having a first pivotal connection at one end to the door, a link having a second pivotal connection at its one end to the other end of the elongated member, a third pivotal connection for the other end of the link, means mounting the third pivotal connection on said partition, and motor means also connected with the second pivotal connection and operable to move the doors between a door-closed position, in which all three pivotal connections are substantially in alignment, and a door-open position, said elongated members, links, and motor means disposed between the walls of said partition.

2. An elongated bottom dump vehicle body having vertical side walls parallel to the direction of straight-ahead movement, bottom panels secured to the lower edges of the side walls and sloping inward and downward and leaving an elongated opening between the inner edges of the panels, a pair of doors having their outer edges adjacent the inner edges of the panels when the doors are in the closed position and with their inner edges coming together, hinge means for each door mounting the doors for movement outward and downward from the door-closed position to the door-open position, a double walled partition between the ends of the body and above the doors, an elongated member for each door having a first pivotal connection at one end to the door, a link having a second pivotal connection at its one end to the other end of the elongated member, a third pivotal connection for the other end of the link, means mounting the third pivotal connection on said partition, and motor means also connected with the second pivotal connection and operable to move the doors between a door-closed position, in which all three pivotal connections are substantially in alignment, and a door-open position in which each door forms a continuation of the sloping bottom panel adjacent to which it is hinged.

3. An elongated bottom dump vehicle body having vertical side walls parallel to the direction of straight-ahead movement, bottom panels secured to the lower edges of the side walls and sloping inward and downward and leaving an elongated opening between the inner edges of the panels, a pair of doors having their outer edges adjacent the inner edges of the panels when the doors are in the closed position and with their inner edges coming together, hinge means mounting the doors for movement outward and downward from the door-closed position to the door-open position, a double walled partition between the ends of the body and above the doors, an elongated member for each door having a first pivotal connection at one end to the door, a link having a second pivotal connection at its one end to the other end of the elongated member, a third pivotal connection for the other end of the link, means mounting the third pivotal connection on said partition between the walls thereof, and motor means also connected with the second pivotal connection and operable to move the doors betwen a door-open position in which each door forms a continuation of the sloping bottom panel adjacent to which it is hinged, and a door-closed position in which all three pivotal connections are substantially in alignment.

4. An elongated bottom dump vehicle body having vertical side walls parallel to the direction of straight-ahead movement, bottom panels secured to the lower edges of the side walls and sloping inward and downward and leaving an elongated opening between the inner edges of the panels, a pair of doors having their outer edges adjacent the inner edges of the panels when the doors are in the closed position and with their inner edges coming together, hinge means for each door mounting the doors for movement outward and downward from the door-closed position to the door-open position, a double walled partition between the ends of the body and above the doors, an elongated member for each door having a first pivotal connection at one end to the door, a link having a second pivotal connection at its one end to the other end of the elongated member, a third pivotal connection for the other end of the link, means mounting the third pivotal connection on said partition, and double-acting fluid operated motor means also connected with the second pivotal connection and operable to move the doors between a door-closed position, in which all three pivotal connections are substantially in alignment, and a door-open position, said elongated members, links, and motor means disposed between the walls of said partition.

5. An elongated bottom dump vehicle body having vertical side walls parallel to the direction of straight-ahead movement, bottom panels secured to the lower edges of the side walls and sloping inward and downward and leaving an elongated opening between the inner edges of the panels, a pair of doors having their outer edges adjacent the inner edges of the panels when the doors are in the closed position and with their inner edges coming together, hinge means for each door mounting the doors for movement outward and downward from the door-closed position to the door-open position, a double walled partition between the ends of the body and above the doors, an elongated member for each door having a first pivotal connection at one end to the door and operable to close the door against the pull of gravity, a link having a second pivotal connection at its one end to the other end of the elongated member, a third pivotal connection for the other end of the link, means mounting the third pivotal connection on said partition, and motor means also connected with the second pivotal connection and holding the three pivotal connections substantially in alignment with the third pivotal connection disposed between the first and second pivotal connections in the door-closed position, and operable to move the second pivotal connection out of said alignment whereby the pull of gravity is effective to move the doors toward the open position, said elongated members, links, and motor means disposed between the walls of said partition.

6. An elongated bottom dump vehicle body having vertical side walls parallel to the direction of straight-ahead movement, bottom panels secured to the lower edges of the side walls and sloping inward and downward and leaving an elongated opening between the inner edges of the panels, a pair of doors having their outer edges adjacent the inner edges of the panels when the doors are in the closed position and with their inner edges coming together, hinge means mounting the doors for movement outward and downward from the door-closed position to the door-open position, a double walled partition between the ends of the body and above the doors, an elongated member for each door having a first pivotal connection at one end to the door and operable to close the door against the pull of gravity, a link having a second pivotal connection at its one end to the other end of the elongated member, a third pivotal connection for the other end of the link, means mounting the third pivotal connection on said partition, and double-acting fluid motor means also connected with the second pivotal connection and holding the three pivotal connections substantially in alignment with the third pivotal connection disposed between the first and second pivotal connections in the door-closed position and operable to move the second pivotal connection out of said alignment whereby the pull of gravity biases the doors open against the resistance of the motor, said elongated members, links, and motor means disposed between the walls of said partition.

(References on following page)

References Cited in the file of this patent

UNITED STATES PATENTS

| | | |
|---|---|---|
| Re. 13,362 | Christianson | Jan. 16, 1912 |
| 571,482 | Johnson | Nov. 17, 1896 |
| 670,615 | King | Mar. 26, 1901 |
| 700,767 | Hart | May 27, 1902 |
| 722,299 | Hansen | Mar. 10, 1903 |
| 758,135 | Harrison | Apr. 26, 1904 |
| 806,862 | Ames | Dec. 12, 1905 |
| 1,013,929 | Collins | Jan. 9, 1912 |
| 1,114,350 | Harrigian | Oct. 20, 1914 |
| 1,174,134 | Elliott | Mar. 7, 1916 |
| 2,494,472 | De Saussure | Jan. 10, 1950 |
| 2,836,332 | Standish et al. | May 27, 1958 |
| 2,836,461 | Shadwick et al. | May 27, 1958 |
| 2,927,541 | Lunde | Mar. 8, 1960 |

FOREIGN PATENTS

| | | |
|---|---|---|
| 11,873 | Great Britain | 1903 |